(12) United States Patent
Galvis et al.

(10) Patent No.: US 11,855,270 B2
(45) Date of Patent: Dec. 26, 2023

(54) COLD PLATE HEAT EXCHANGER

(71) Applicant: Dana Canada Corporation, Oakville (CA)

(72) Inventors: Elmer Galvis, Oakville (CA); Farbod Vakilimoghaddam, Oakville (CA)

(73) Assignee: DANA CANADA CORPORATION, Oakville (CA)

( * ) Notice: Subject to any disclaimer, the term of this patent is extended or adjusted under 35 U.S.C. 154(b) by 834 days.

(21) Appl. No.: 16/752,244

(22) Filed: Jan. 24, 2020

(65) Prior Publication Data

US 2020/0243934 A1 Jul. 30, 2020

Related U.S. Application Data

(60) Provisional application No. 62/797,684, filed on Jan. 28, 2019.

(51) Int. Cl.
| | |
|---|---|
| *H01M 10/6554* | (2014.01) |
| *F28F 3/02* | (2006.01) |
| *F28F 3/12* | (2006.01) |
| *F28F 13/12* | (2006.01) |
| *H01M 10/613* | (2014.01) |
| *H01M 10/625* | (2014.01) |
| *F28F 13/08* | (2006.01) |

(52) U.S. Cl.
CPC ........... *H01M 10/6554* (2015.04); *F28F 3/02* (2013.01); *F28F 3/12* (2013.01); *F28F 13/08* (2013.01); *F28F 13/12* (2013.01); *H01M 10/613* (2015.04); *H01M 10/625* (2015.04); *H01M 2220/20* (2013.01)

(58) Field of Classification Search
CPC .......... H01M 10/6554; H01M 10/613; H01M 10/625; H01M 2220/20; F28F 3/02; F28F 3/12; F28F 13/08; F28F 13/12
USPC ......................................................... 429/120
See application file for complete search history.

(56) References Cited

U.S. PATENT DOCUMENTS

| | | | | |
|---|---|---|---|---|
| 3,372,743 A | * | 3/1968 | Pall ....................... | F28D 9/0025 165/166 |
| 4,628,991 A | * | 12/1986 | Hsiao ................. | G01R 31/2891 269/69 |
| 4,815,532 A | * | 3/1989 | Sasaki ................... | F28F 17/005 165/152 |

(Continued)

*Primary Examiner* — Tho V Duong
*Assistant Examiner* — Raheena R Malik
(74) *Attorney, Agent, or Firm* — McCoy Russell LLP

(57) ABSTRACT

A heat exchanger may include a perforated plate having a plurality of openings sandwiched between a first plate and a second plate. The first plate may have a first plate central planar surface, a first plate peripheral wall extending from an internal face of the first plate central planar surface towards the second plate, and an inlet permitting fluid flow on to the internal face of the central planar surface. The second plate may have a second plate central planar surface, a second plate peripheral wall extending from an internal face of the second plate central planar surface towards the first plate, and an outlet permitting fluid to exit the heat exchanger. The first plate, the second plate and the perforated may be coupled and define a fluid passage for flow of a heat exchanger fluid from the inlet to the outlet.

18 Claims, 12 Drawing Sheets
(6 of 12 Drawing Sheet(s) Filed in Color)

(56) References Cited

U.S. PATENT DOCUMENTS

| | | | | |
|---|---|---|---|---|
| 5,538,077 | A * | 7/1996 | So | F28F 3/04 |
| | | | | 165/170 |
| 5,697,433 | A * | 12/1997 | Kato | F28F 3/04 |
| | | | | 165/170 |
| 5,718,286 | A * | 2/1998 | Damsohn | F28D 9/0075 |
| | | | | 165/167 |
| 5,836,383 | A * | 11/1998 | Zwittig | F28F 3/12 |
| | | | | 165/DIG. 360 |
| 6,305,079 | B1 * | 10/2001 | Child | F28D 9/0043 |
| | | | | 257/E21.244 |
| 6,530,425 | B2 * | 3/2003 | Wehrmann | F28D 9/0093 |
| | | | | 165/166 |
| 6,904,966 | B2 * | 6/2005 | Philpott | F28F 21/065 |
| | | | | 165/905 |
| 7,077,858 | B2 * | 7/2006 | Fletcher | F28F 3/12 |
| | | | | 607/104 |
| 7,334,631 | B2 * | 2/2008 | Kato | F28F 13/06 |
| | | | | 165/170 |
| 7,516,781 | B2 * | 4/2009 | Kamiyama | F28D 1/035 |
| | | | | 165/170 |
| 8,120,914 | B2 * | 2/2012 | Kajiura | H01L 23/473 |
| | | | | 361/689 |
| 8,813,834 | B2 * | 8/2014 | Chin | H01L 23/427 |
| | | | | 165/104.26 |
| 8,863,542 | B2 * | 10/2014 | Damsohn | F28D 1/0478 |
| | | | | 62/239 |
| 8,997,840 | B2 * | 4/2015 | Yang | B05D 5/04 |
| | | | | 165/104.26 |
| 10,158,151 | B2 * | 12/2018 | Kenney | F28F 3/00 |
| 10,263,301 | B2 * | 4/2019 | Kenney | H01M 10/6568 |
| 10,601,093 | B2 * | 3/2020 | Vanderwees | H01M 10/6557 |
| 10,605,545 | B2 * | 3/2020 | Meshenky | F02B 39/005 |
| 2001/0004370 | A1 * | 6/2001 | Miyajima | H01L 23/473 |
| | | | | 257/E23.098 |
| 2003/0196451 | A1 * | 10/2003 | Goldman | F28F 13/12 |
| | | | | 62/515 |
| 2008/0173428 | A1 * | 7/2008 | Moser | F28D 7/08 |
| | | | | 29/890.035 |
| 2009/0239112 | A1 * | 9/2009 | Vanderwees | H01M 8/0263 |
| | | | | 429/429 |
| 2010/0132930 | A1 * | 6/2010 | Izenson | F28F 3/12 |
| | | | | 165/173 |
| 2010/0258278 | A1 * | 10/2010 | Moon | H01L 23/427 |
| | | | | 165/104.21 |
| 2012/0107649 | A1 * | 5/2012 | Anderson | H01M 10/647 |
| | | | | 429/50 |
| 2012/0181712 | A1 * | 7/2012 | Vanderwees | H01M 8/04149 |
| | | | | 261/102 |
| 2012/0258337 | A1 * | 10/2012 | Wang | H01M 10/625 |
| | | | | 429/50 |
| 2013/0244077 | A1 * | 9/2013 | Palanchon | H01M 10/61 |
| | | | | 429/120 |
| 2013/0312939 | A1 * | 11/2013 | Uchida | H01L 23/427 |
| | | | | 165/104.26 |
| 2015/0044538 | A1 * | 2/2015 | Katayama | H01M 10/6556 |
| | | | | 429/120 |
| 2015/0180059 | A1 * | 6/2015 | Vanderwees | B01D 65/003 |
| | | | | 261/102 |
| 2016/0036104 | A1 * | 2/2016 | Kenney | F28F 3/12 |
| | | | | 165/170 |
| 2016/0204486 | A1 * | 7/2016 | Kenney | F28F 1/045 |
| | | | | 29/890.03 |
| 2020/0243934 | A1 * | 7/2020 | Galvis | F28F 3/02 |
| 2020/0266505 | A1 * | 8/2020 | Park | H01M 10/613 |
| 2022/0243996 | A1 * | 8/2022 | Gaigg | H01M 50/204 |

* cited by examiner

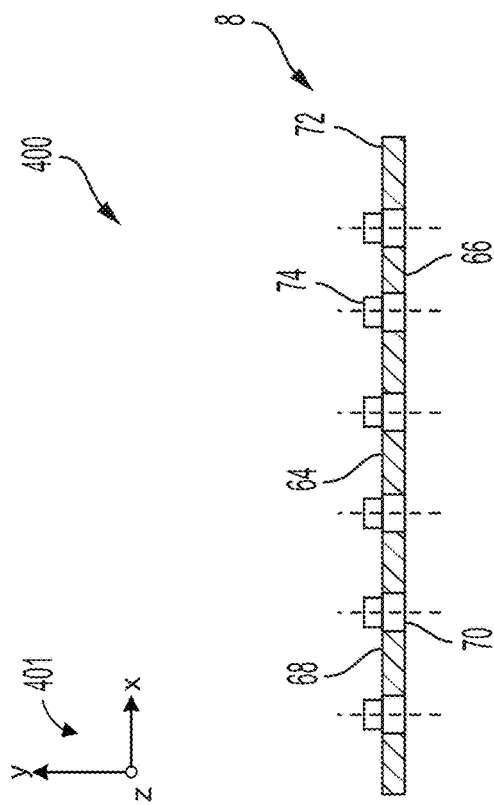
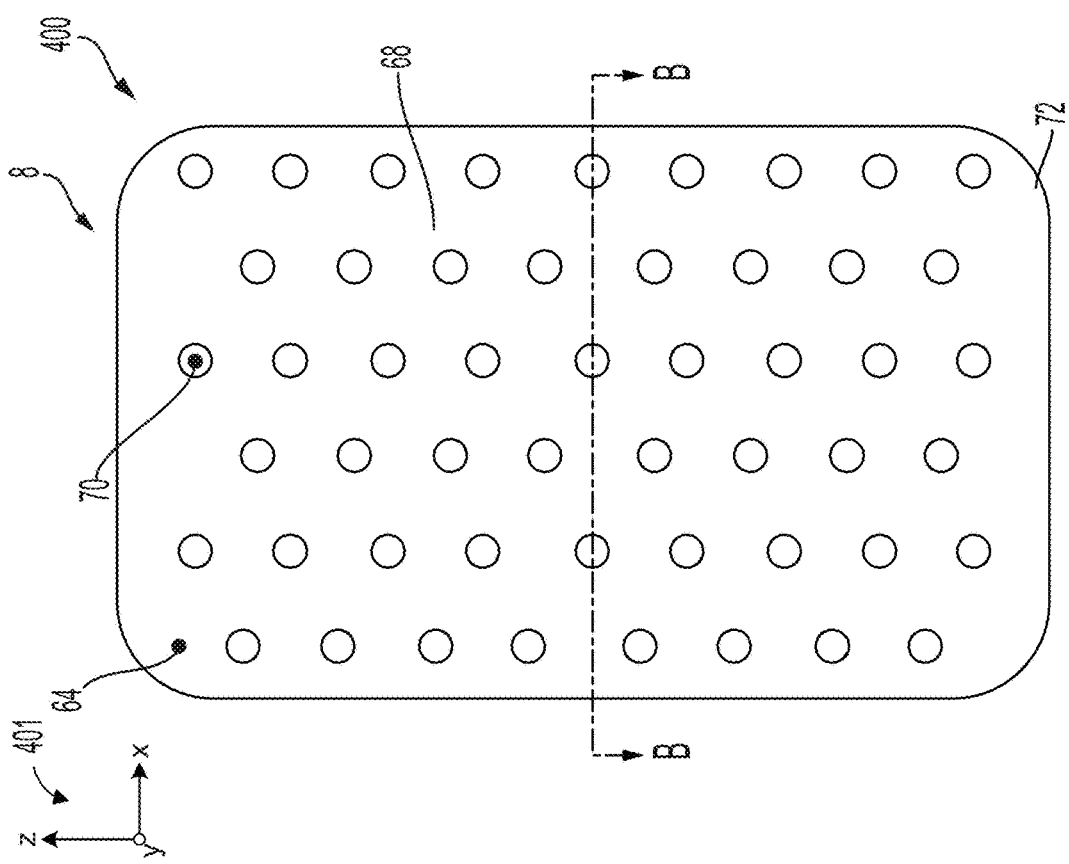

Detail A

COLD PLATE HEAT EXCHANGER

CROSS-REFERENCE FOR RELATED APPLICATION

The present application claims priority to U.S. Provisional Application No. 62/797,684, entitled "Cold Plate Heat Exchanger", and filed on Jan. 28, 2019. The entire contents of the above-listed application are hereby incorporated by reference for all purposes.

TECHNICAL FIELD

The specification relates to a heat exchanger. In a particular aspect, the specification relates to a cold plate heat exchanger for use with one or more batteries.

BACKGROUND AND SUMMARY

Even though different battery chemistries have varying characteristics, the battery performance and cycle-life depend heavily on the applied load (and therefore on the charge/discharge rate), and the operating conditions (such as temperature). Batteries generally work efficiently over a range of discharge rates (C/8-2 C), operating temperatures (typically from 20° C. to 45° C.), and uniformity (typically under 5° C.).

Electrical vehicle batteries generate heat that need to be dissipated. Typically, the heat is transferred to a fluid that circulates in a cold plate. The cold plate consists of flow passages for the working fluid (e.g. water-ethylene glycol 50/50% solution) which absorb heat generated by battery cells. The cold plate may maintain the battery cells at a target operating temperature and uniform temperature distribution.

One challenge with battery cooling is the ability to attain uniform temperature distribution via a cold plate design with low temperature differential. In addition, current cold plate designs have channels or dimples where the fluid is forced to move through a desired path. The working fluid increases in temperature before the cooling process on the following cell begins, driving a higher gradient of temperatures within the cells.

FIG. 1 depicts a first example of a conventional cold plate heat exchanger 100 showing the increase of coolant temperature before cooling the next cell. In such an embodiment, cell A is cooled down with the coldest fluid, cell B with a warmer fluid than cell A, and cell C is cooled with the hottest fluid. Therefore, non-uniform coolant temperature is provided to cold battery cells causing higher gradients of temperature between the cells. FIG. 2 further illustrates a fluid temperature increase along a second example of a conventional cold plate heat exchanger 200, as the fluid flows in the flow direction (shown with an arrow) causing non-uniform fluid temperature on the plate 200. As the fluid flows through the cold plate heat exchanger 200, the temperature of the heat exchanger fluid increases. As shown in FIGS. 3A-3B, this results in non-uniform temperature flow, leading to poor cooling efficiency, where the temperature difference between one side of a third example of a conventional heat exchanger cold plate 300 is significantly different from the temperature of the other side of the heat exchanger cold plate 300.

Thus it is desirable to provide a heat exchanger that may reduce the temperature difference of the heat exchanger fluid flowing in the heat exchanger. In addition, there is a need for a heat exchanger that can help provide a more uniform cooling surface during operation. Further, there is a need for a heat exchanger that can provide more consist temperature control of batteries placed on the heat exchanger.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will now be made, by way of example, to the accompanying drawings which show example embodiments of the present application.

FIG. 8 is a plan view of a first example of a perforated plate of which may be included in a heat exchanger disclosed herein;

FIG. 9 is a sectional view of the perforated plate of FIG. 8, along the line B-B;

FIGS. 4-17 are shown approximately to scale.

DETAILED DESCRIPTION

In one aspect, the specification relates to a heat exchanger having a first plate, a second plate and a perforated plate positioned between the first plate and the second plate.

In accordance with the embodiments disclosed herein, the first plate is also referred to as the bottom plate. Upon assembly (as described further herein), the perforated plate is placed on the bottom plate and the second plate (also referred to as the top plate) is positioned on an opposing face of the perforated plate. In one embodiment, battery cells demanding temperature control are placed on a face of the top plate that faces away from the perforated plate.

For purposes of illustration and explanation, the heat exchanger (also referred to herein as the cold plate heat exchanger or cold plate) has been generally described (with reference to the figures) by initially describing the first plate, followed by an embodiment of the second plate, the perforated plate and then the assembled form of the heat exchanger. Additional embodiments of the perforated plate are also described that can be used to form the heat exchanger disclosed herein.

Figure 1:
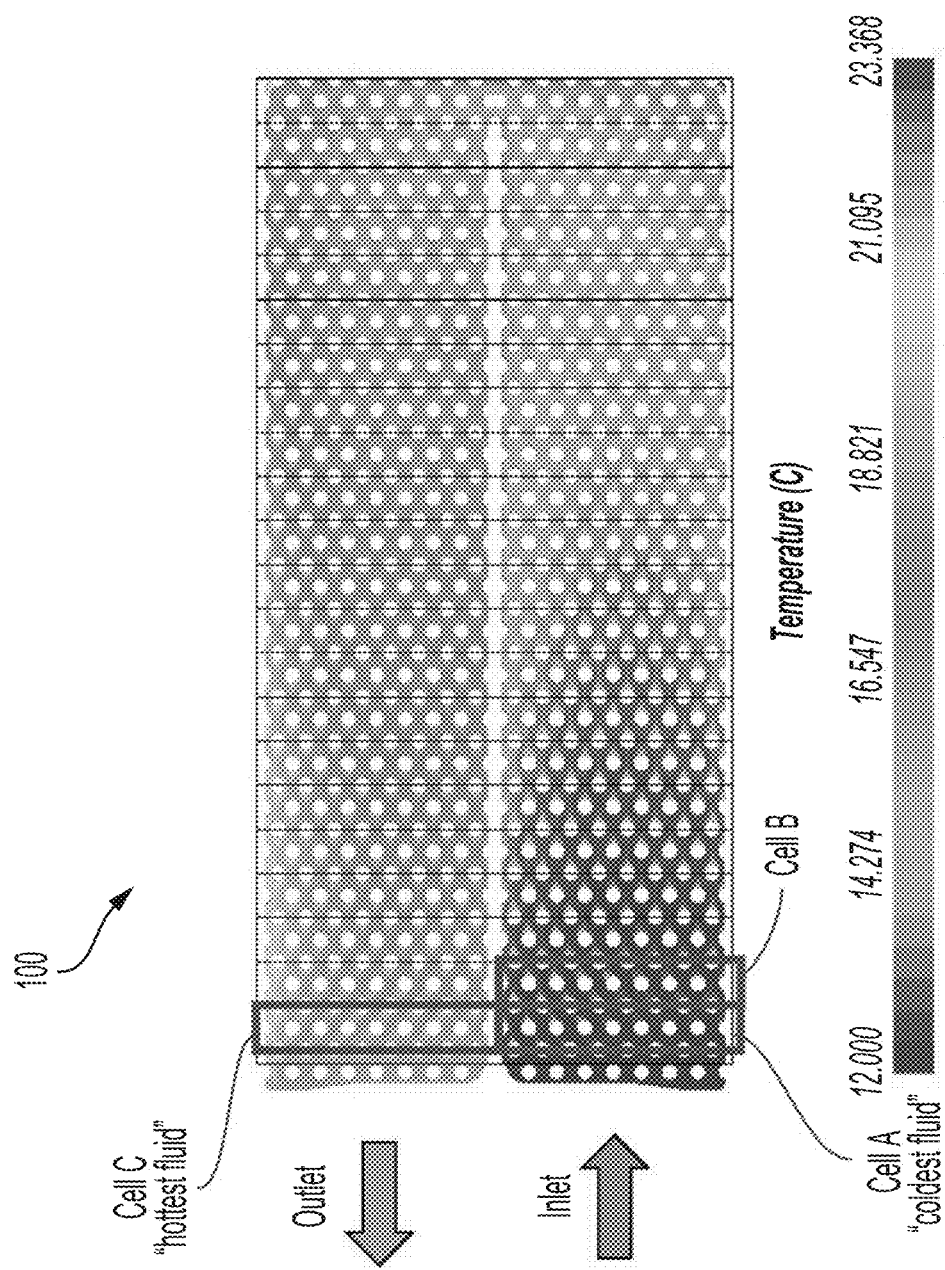
FIG. 1 shows a plan view of a portion of a first example of a conventional cold plate showing an increase in coolant temperature in adjacent cells.
Figure 2:
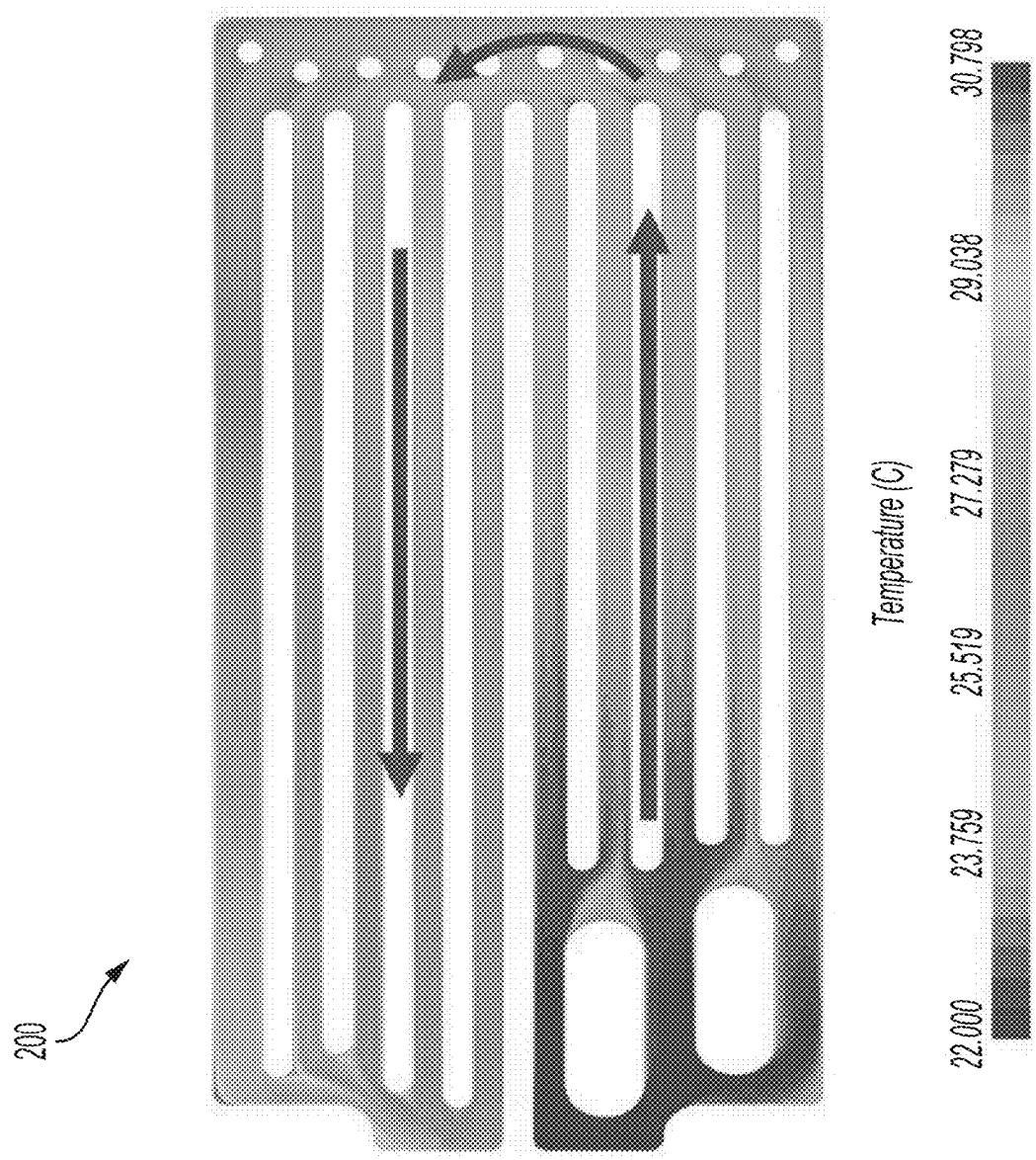
FIG. 2 shows a plan view of a second example of a conventional cold plate showing an increase in temperature of the heat exchanger fluid from the inlet to the outlet.
Figure 3A:
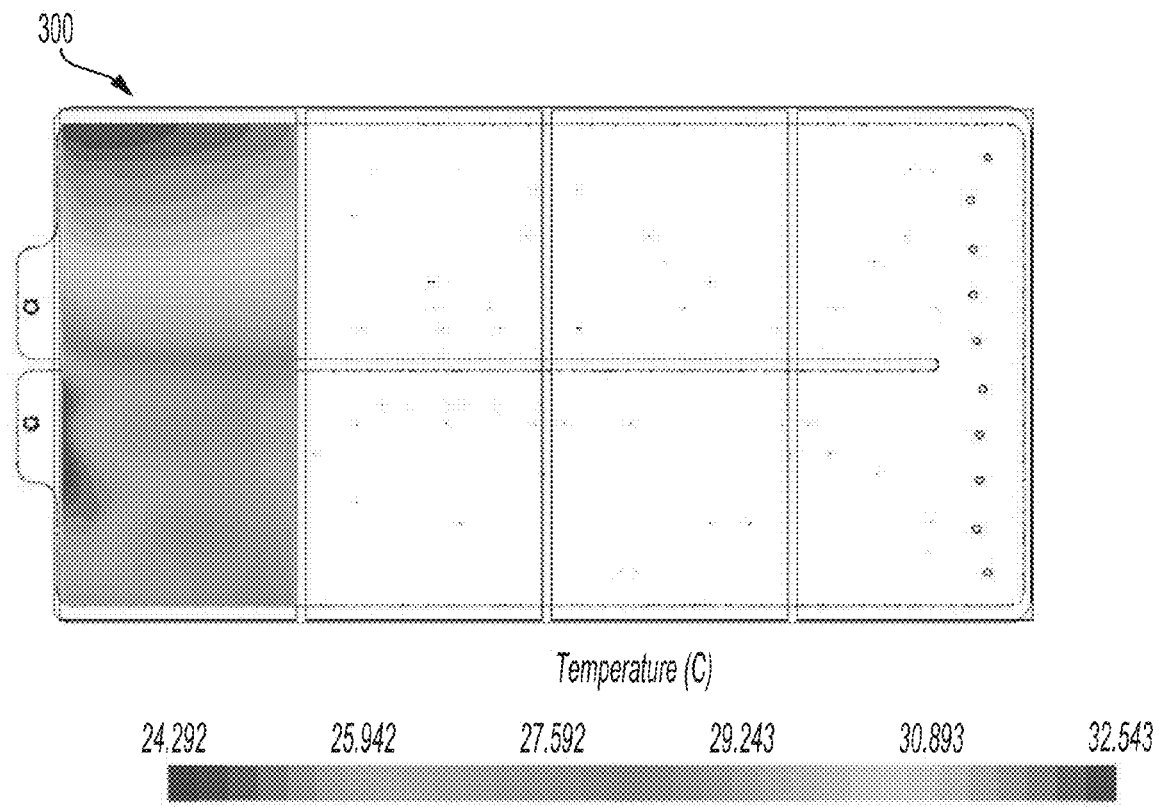
FIG. 3A shows a plan view of a third example of a conventional cold plate showing temperature at an inlet side of a heat exchanger.
Figure 3B:
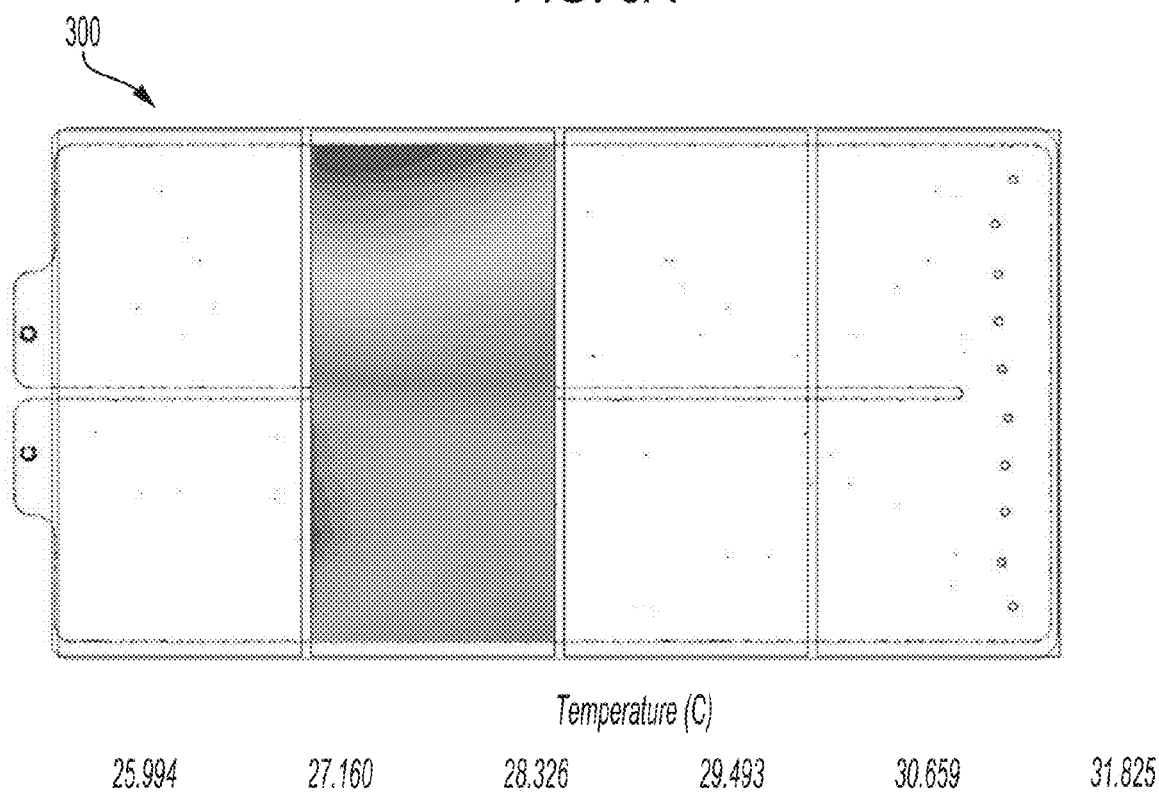
FIG. 3B shows a plan view of the third example of a conventional cold plate showing temperature difference at an outlet side of the heat exchanger.
Figure 5:
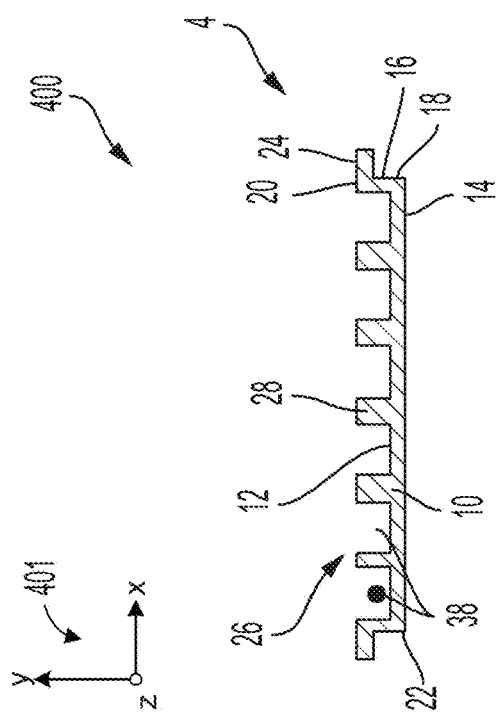
FIG. 5 is a sectional view of the first plate of FIG. 4, along the line A-A.
Figure 4:
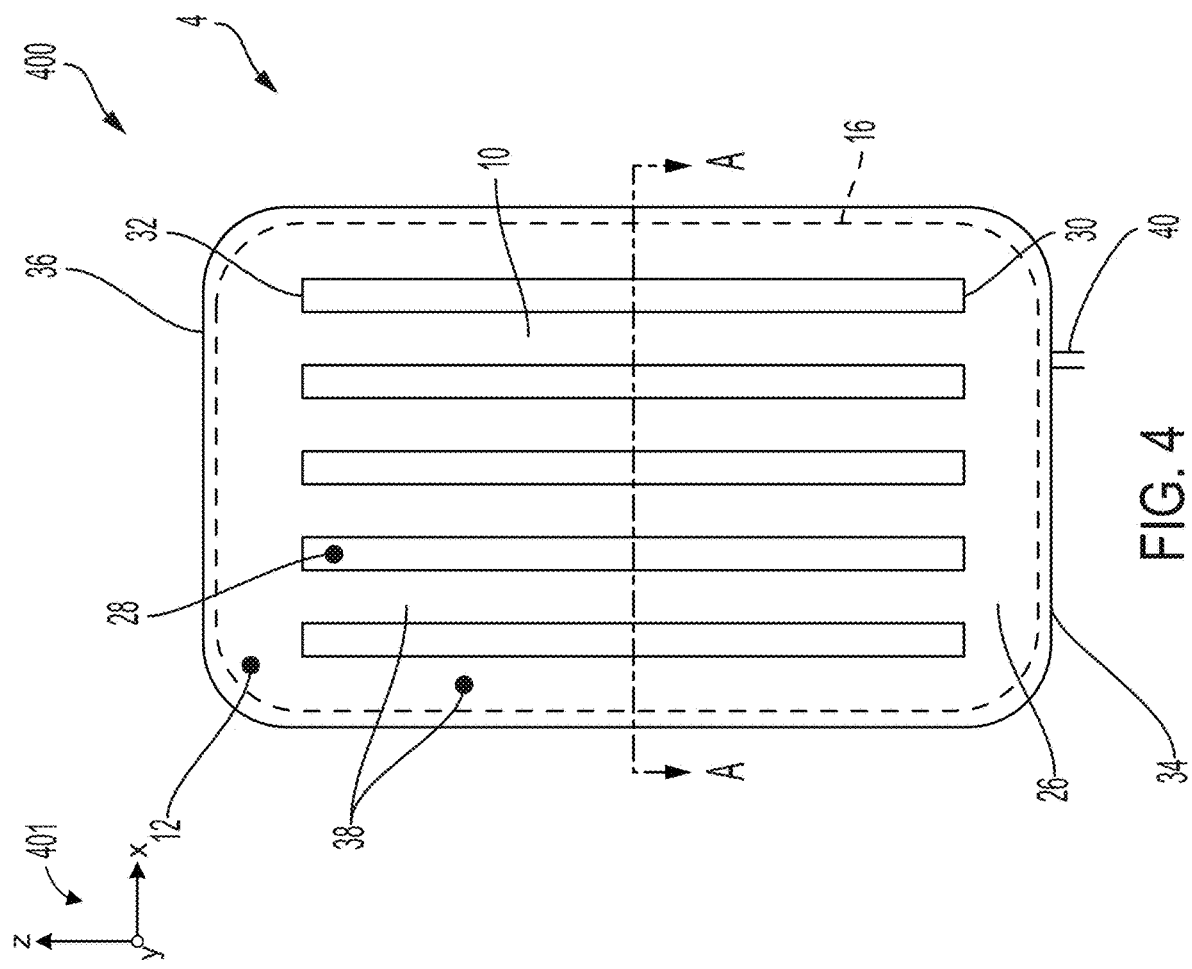
FIG. 4 is a plan view of a of a first plate of a first embodiment of a heat exchanger disclosed herein.

Turning now to FIGS. 4 and 5, FIG. 4 shows a plan view and FIG. 5 shows a cross-sectional view along the lines A-A of a first plate 4 of a first embodiment of a heat exchanger 400 disclosed herein. A set of references axes 401 are provided for comparison between views shown, indicating a y-axis, an x-axis, and a z-axis. In the embodiment disclosed herein, a first plate 4 has a generally rectangular structure as seen from the plan view of FIG. 4, being aligned longitudinally with the z-axis and where heat exchanger fluid flows longitudinally through a length of the first plate 4. However, the heat exchanger 400 is non-limiting example and other shapes and structures are also possible.

The first plate 4 has a generally central planar surface 10 that has an internal face 12 and an opposing external face 14, as shown in FIG. 5. The internal face 12 of the first plate 4 is configured to allow heat exchanger fluid to enter and flow through the heat exchanger 400. The external face 14 of the first plate 4 faces towards an outside of the heat exchanger 400. In one embodiment, the external face 14 of the first plate 4 does not come into contact with the heat exchanger fluid. The external face 14 of the first plate 4, as shown, has a generally planar surface, however, other shapes and structures are possible depending upon desired application. In the embodiment disclosed herein, battery cells, such a battery cells 102 shown in FIGS. 10-12B, are not shown but may be positioned on the external face 14 of the first plate 4, e.g., against the external face 14, in some examples. However, in the heat exchanger 400 disclosed herein, the external face 14 of the first plate 4 is most distal, e.g., furthest from, from the battery cells.

In the embodiment disclosed herein, the first plate 4 has a wall 16 that extends along the y-axis from a peripheral edge 22 of the internal face 12 of the central planar surface 10. The wall 16 has a first end 18 and an opposing second end 20, with the first end 18 of the wall 16 being coupled to or extending from the central planar surface 10. The first plate peripheral wall 16 extends away from the external face 14 of the central planar surface 10 along the y-axis. In addition, the first plate peripheral wall 16 extends along and from the entire peripheral edge 22 of the central planar surface 10, e.g., around an entire circumference of the first plate 4. The wall 16 and the central planar surface 10 together form a container or inlet chamber 26, as shown in FIG. 4, for receiving the heat exchanger fluid in the heat exchanger 400.

In the embodiment disclosed, the first plate 4 has a flange 24, as shown in FIG. 5, coupled at the second end 20 of the first plate peripheral wall 16. The first plate flange 24 extends away from the central planar surface 10, and provides a surface for coupling of the first plate 4 to a perforated plate, as described herein. In the embodiment shown, the flange 24 provides a flat planar surface for coupling to the perforated plate.

In a particular embodiment, the central planar surface 10 of the first plate 4 may be provided with one or more protuberances (not shown) or one or more ribs 28 coupled to or extending from the internal face 12 of the central planar surface 10 of the first plate 4. The number, position and shapes of the one or more protuberances or ribs 28 is not limited and may be varied depending upon application demands. In the embodiment shown in FIG. 4, the first plate 4 is provided with a plurality of ribs 28 that are coupled to or extend from the central planar surface 10 along the y-axis and extend from the internal face 12 of the first plate 4. The one or more ribs 28 extend in the same direction as the first plate peripheral wall 16; in other words, the one or ribs 28 extend away from the external face 14 of the first plate 4.

In addition, in a particular embodiment, the one or more ribs 28 are positioned along the length of the first plate 4, e.g., aligned longitudinally with the z-axis, with one end (or a first end) 30 of the one or more ribs 28 proximate to a first end 34 of the first plate 4, and the second opposing end 32 of the one or more ribs 28 proximate to a second end 36 of the first plate 4. The presence of the one or more ribs 28 leads to formation of one or more channels 38 for flow of the heat exchanger fluid in the inlet chamber 26. In the embodiment shown in FIG. 4, the one or more ribs 28 avoid contacting the first end 34 or the second end 36 of the first plate 4.

Figure 11:
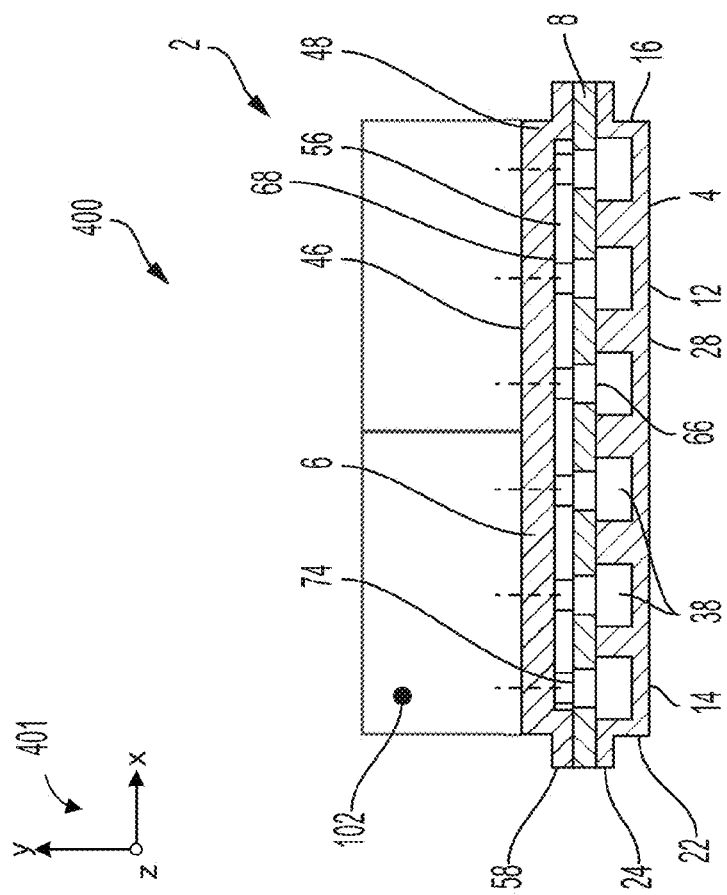
FIG. 11 is a sectional view of the heat exchanger of FIG. 10, along the line D-D.
Figure 12A:
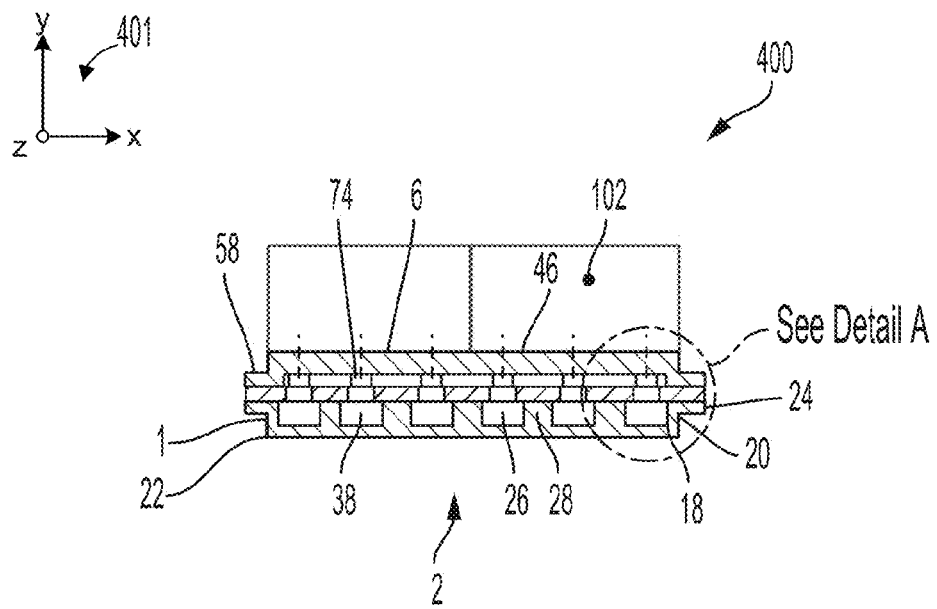
FIG. 12A shows the sectional view of the heat exchanger shown in FIG. 11.

In one embodiment, as shown in FIG. 5, the one or more ribs 28 have a height, along the y-axis, such that a free end of the one or more ribs lies in a same plane as the second end 20 of the peripheral wall 16 and the first plate flange 24, allowing the perforated plate, described further below, to rest on the free end of the one or more ribs 28 and the first plate flange 24 as shown in FIGS. 11 and 12A. Alternatively, as described herein, the height of the one or more ribs 28 may be less than the height of the peripheral wall 16, being closer to the internal face 12 of the first plate 4 than the plane having the second end 20 of the peripheral wall 16 and the first plate flange 24. Such an embodiment may be used to accommodate the perforated plate shown in FIG. 13 (as described herein) to be used a heat exchanger.

Although ribs 28 are shown in the embodiment disclosed herein, other structures, such as protuberances, may be formed to create flow channels or a turbulent flow in the inlet chamber 26, depending upon the design and application requirements.

The first plate 4 also has an inlet 40 for allowing the heat exchanger fluid to enter the heat exchanger 400. The position and shape of the inlet 40 is not limited and may be varied based on application, so long as fluid is able to flow from the inlet 40 to the inlet chamber 26. The position of the inlet 40 in the first plate 4 may be varied, with the inlet 40 provided on the first plate peripheral wall 16 or the first plate central planar surface 10. Further, although the inlet 40 is depicted on FIG. 4 on the first end 34 of the first plate 4, in alternate embodiments, the inlet 40 may be provided at the second end 36 of the first plate 4 or any along of the longitudinal edges of the first plate 4.

Figure 7:
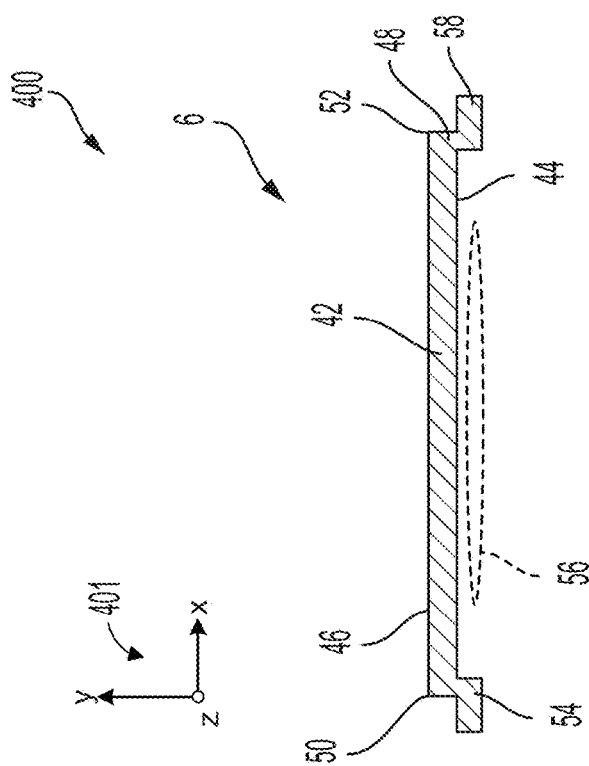
FIG. 7 is a sectional view of the second plate disclosed in FIG. 6, along the line C-C.
Figure 6:
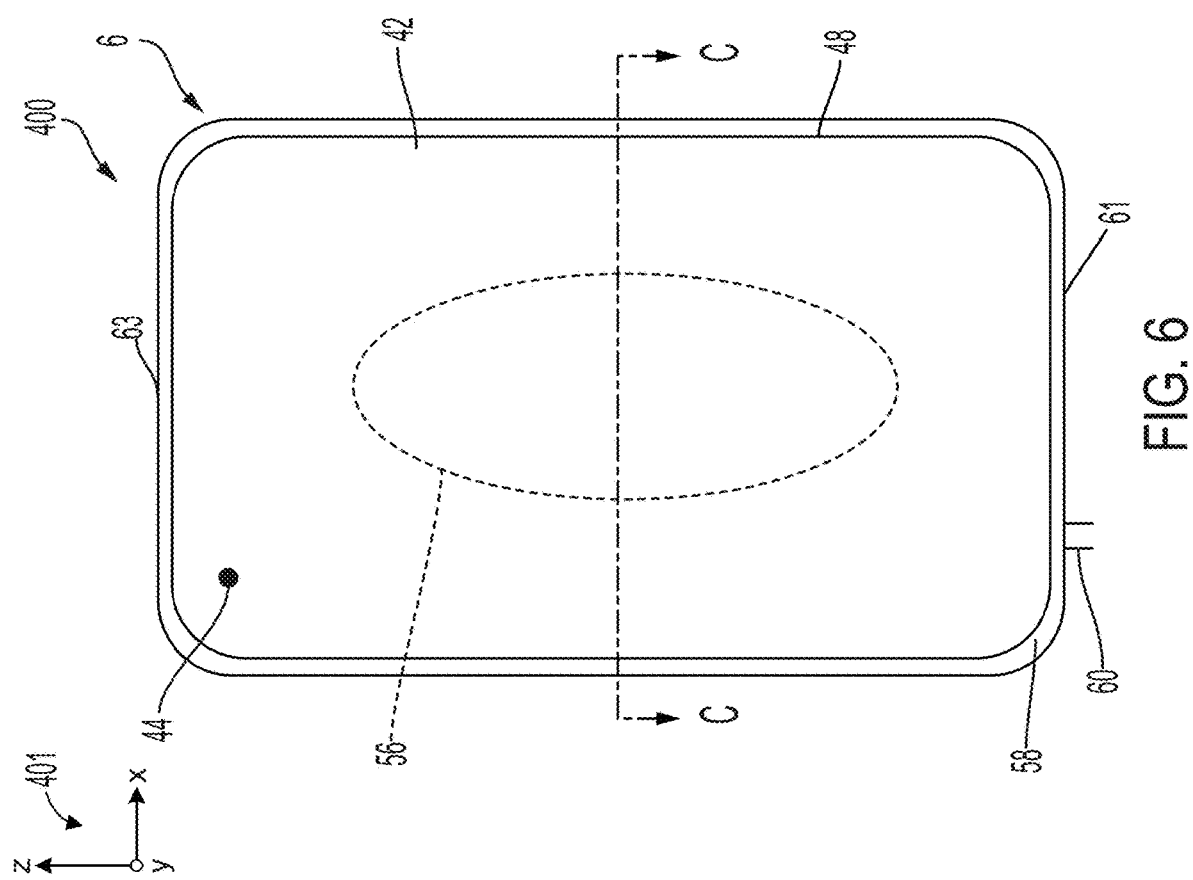
FIG. 6 is a plan view of a second plate of the first embodiment of the heat exchanger disclosed herein.

FIG. 6 shows a plan view and FIG. 7 shows a cross-sectional view along the line C-C of a second plate 6 of the heat exchanger 400 disclosed herein. In the embodiment disclosed herein, the second plate 6 has a generally rectangular structure as seen from the plan view, being longitudinally aligned with the z-axis and with the heat exchanger fluid flowing along a length, defined along the z-axis of the second plate 6. However, the second plate 6 is not limited to a particular shape, and other shapes and structures are also possible. Moreover, in the embodiment shown, the shape of the second plate 6 is complementary to the shape of the first plate 4 of FIGS. 4 and 5, so that the first plate 4 and the second plate 6 together provide an enclosed passage for flow of a heat exchanger fluid. In a particular embodiment, as shown, the first plate 4 and the second plate 6 have a similar length and width.

The second plate 6 has a generally central planar surface 42 that has an internal face 44 and an opposing external face 46, as shown in FIG. 7. The internal face 44 of the second plate 6 is configured to allow heat exchanger fluid to flow out of the heat exchanger 400 while cooling battery cells that are in contact with the second plate external face 46. The external face 46 of the second plate 6 faces towards the outside of the heat exchanger 400. In one embodiment, the external face 46 of the second plate 6 does not generally come in contact with the heat exchanger fluid. The external face 46 of the second plate 6, as shown, is depicted with a generally planar surface, but other examples may include other shapes and structures of the external face 46. In the embodiment disclosed herein, the battery cells may be positioned on, e.g., against, the external face 46 of the second plate 6. Moreover, the external face 46 of the second plate 6 may be adapted, in some examples, to provide engagement with the battery cells for heat exchange.

In the embodiment disclosed herein, the second plate 6 has a wall 48 that extends downwards along the y-axis from the peripheral edge 50 of the internal face 44 of the central planar surface 42. The wall 48 has a first end 52 and an opposing second end 54, with the first end 52 of the wall 48 being coupled to or extending from the central planar surface 42. The second plate peripheral wall 48 extends away from the external face 46 of the central planar surface 42. In addition, the second plate peripheral wall 48 extends along and from the entire peripheral edge 50 of the second plate central planar surface 42. Like the first plate peripheral wall 16 of FIGS. 4 and 5, in the embodiment disclosed, the second plate peripheral wall 48 also extends perpendicularly from the second plate central planar surface 42. However, other angles, shapes and curves are possible. The second plate peripheral wall 48 and the second plate central planar surface 42 together provide a container or outlet chamber 56 for receiving the heat exchanger fluid after it has entered the heat exchanger 400 and passed through the inlet chamber 26. The outlet chamber 56 may be oval-shaped when viewed along the y-axis, as shown in FIG. 6.

In the embodiment disclosed, the second plate 6 has a flange 58 coupled at the second end 54 of the second plate peripheral wall 48. The second plate flange 58 extends away from the central planar surface 42 along the x-axis, and provides a surface for coupling of the second plate 6 to the perforated plate, as described herein. In the embodiment shown, the second plate flange 58 provides a flat planar surface for coupling to the perforated plate.

The second plate 6 also has an outlet 60, positioned at a first end 61 of the second plate 60. The position and shape of the inlet 40 is not limited and may be varied based on application, so long as fluid is able to flow from the outlet chamber 56 to the outlet 60. The position of the outlet 60 in the second plate 6 may be varied, with the outlet 60 provided on the second plate peripheral wall 48 or the second central planar surface 42. Further, although the outlet 60 is depicted in FIG. 6 on the first end 61 of the second plate 6, in alternate embodiments, the outlet 60 may be provided at a second end 63 of the second plate 6 or along any of the longitudinal edges of the second plate 6.

FIG. 8 shows a plan view and FIG. 9 shows a cross-sectional view along the line B-B of a perforated plate 8 of the heat exchanger 400 disclosed herein. In the embodiment disclosed herein, the perforated plate 8 has a generally rectangular structure as seen from the plan view of FIG. 8, being longitudinally aligned with the z-axis. However, the perforated plate 8 is not limited to a particular shape, and other shapes and structures are also possible. Moreover, in the embodiment shown, the shape of the perforated plate 8 is configured to enable the perforated plate 8 to be sandwiched, e.g., stacked, between the first plate 4 and the second plate 6, such that fluid entering the heat exchanger 400 from the inlet 40 can enter into the inlet chamber 26, as shown in FIGS. 4 and 5, and pass to the outlet chamber 56, as shown in FIGS. 6 and 7, before exiting the heat exchanger 400 from the outlet 60, as shown in FIG. 6, in a leak-free manner. In a particular embodiment, as shown, the perforated plate 8 has the same length and width, defined along the x-axis, as the first plate 4 of FIGS. 4 and 5 band the second plate 6 of FIGS. 6 and 7.

The perforated plate 8 has a generally central planar surface 64 that has a first face 66 and an opposing second face 68 as shown in FIG. 9. The perforated plate first face 66 is the surface of the perforated plate 8 that faces the inlet chamber 26 or the first plate 4, while the perforated plate second face 68 is the surface of the perforated plate 8 that faces the outlet chamber 56 (described herein) or the second plate 6.

The perforated plate 8 is provided with a plurality of openings 70 that allow fluid to pass from the inlet chamber 26 to the outlet chamber 56, where the second face 68 of the perforated plate 8 faces the outlet chamber 56 and second plate 6. The shape or number of the openings 70 is not limited and may be varied depending upon application demands. In addition, the plurality of openings 70 are provided on the central planar surface 64 of the perforated plate 8, with the peripheral edge portion 72, which contacts the first plate 4 and the second plate 6 of the heat exchanger 400, lacking any openings 70 to reduce the likelihood of leakage and for providing a surface for coupling.

In one embodiment, as shown in FIG. 9, the perforated plate 8 is provided with a plurality of nozzles 74 on the second face 68. Each of the plurality of nozzles 74 has an opening leading to the plurality of openings 70 on the perforated plate 8 that allows the fluid to flow from the inlet chamber 26 to the outlet chamber 56, e.g., fluidically coupling the inlet chamber 26 to the outlet chamber 56. Each of the plurality of nozzles 74 extends from the second face 68 of the perforated plate 8 to the second plate 6. This leads to a jet-like flow and cooling of the second plate 6 as the heat exchanger fluid flows from the inlet chamber 26 to the outlet chamber 56. The shape of the nozzles 74 is not limited and may be varied, depending upon application. In one embodiment, as shown in FIG. 9, each of the nozzles 74 has a volcano-like structure extending upwards, with respect to the y-axis, from the perforated plate 8 towards the second plate 6. The height, defined along the y-axis of the nozzles 74, including the tip of the volcano-like structure, is spaced from with the internal face 44 of the second plate 6; thus circumventing contact with the internal face 44 of the second plate 6 and allowing fluid flow from the inlet chamber 26 to the outlet chamber 56. In other examples, however, the nozzles 74 may not be volcano-like and instead taper outwards or may have straight sides. In yet another example, the nozzles 74 may not protrude from the perforated plate 8 and may instead be flat openings. Regardless of shape, the nozzle 74 may be openings in the perforate plate 8 allow enabling flow of the heat exchanger fluid from the inlet chamber 26 to the outlet chamber 56 to cool the second plate 6.

Figure 10:
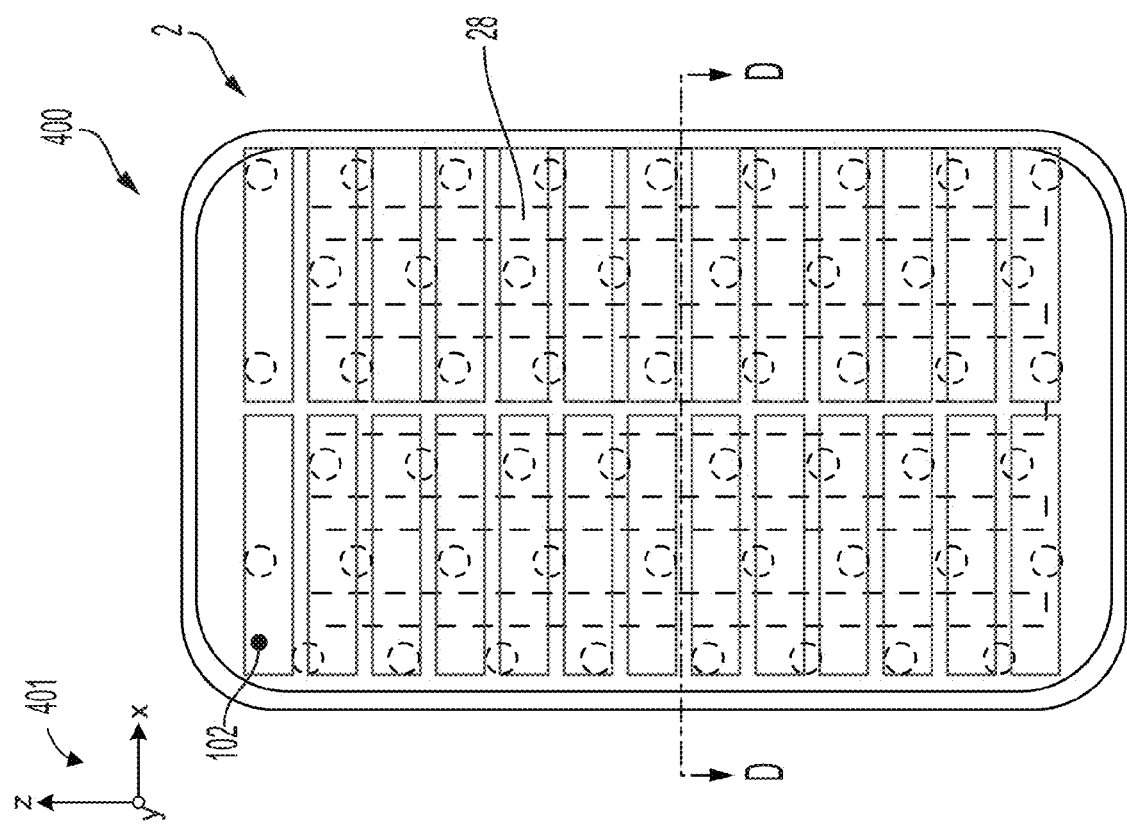
FIG. 10 is a transparent plan view of a second embodiment of a heat exchanger disclosed herein.
Figure 12B:
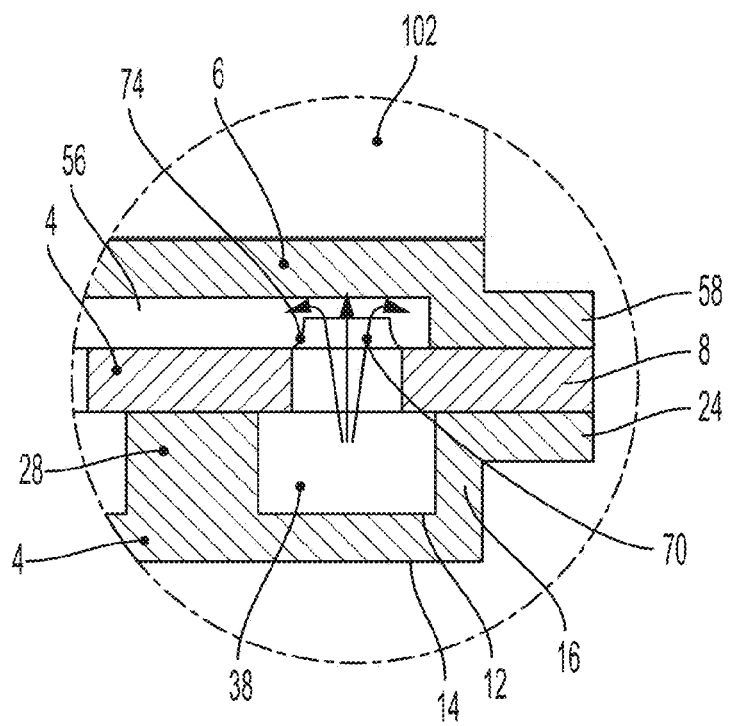
FIG. 12B shows an expanded view of a portion of the sectional view of FIG. 12A.

FIG. 10 shows a plan view and FIG. 11 shows a cross-sectional view along the line D-D of an embodiment of the heat exchanger 400, disclosed herein, having the battery cells 102, as shown in red, placed upon the heat exchanger 400. FIG. 12A shows the same view as FIG. 11 and FIG. 12B shows an expansion of a portion of FIG. 12A, showing flow of a heat exchanger fluid from the inlet chamber 26, which passes through the openings 70 provided in the nozzles 74 and entering into the outlet chamber 56.

As shown in FIGS. 10-12B, the first plate 4 is positioned away from the battery cells 102. The perforated plate 8 is positioned on the first plate 4, with the first face 66 of the perforated plate 8 facing the internal face 12 of the first plate 4. The second plate 6 is positioned on the second face 68 of the perforated plate 8, with the second face 68 of the perforated plate 8 facing the internal face 44 of the second plate 6. The first plate 4, second plate 6 and the perforated plate 8, sandwiched between the first plate 4 and the second plate 6, may provide an enclosed environment for flow of a heat exchanger fluid from the inlet 40, as shown in FIG. 4, to the outlet 60, as shown in FIG. 6, and may help to regulate heat temperature of the battery cells 102 placed on the heat exchanger 400. In the embodiment shown, the battery cells 102 are placed on the external face 46 of the second plate 6.

Figure 14:
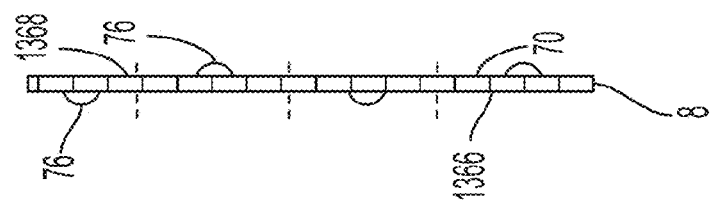
FIG. 14 shows a sectional view along the line E-E of the perforated plate of FIG. 13.
Figure 13:
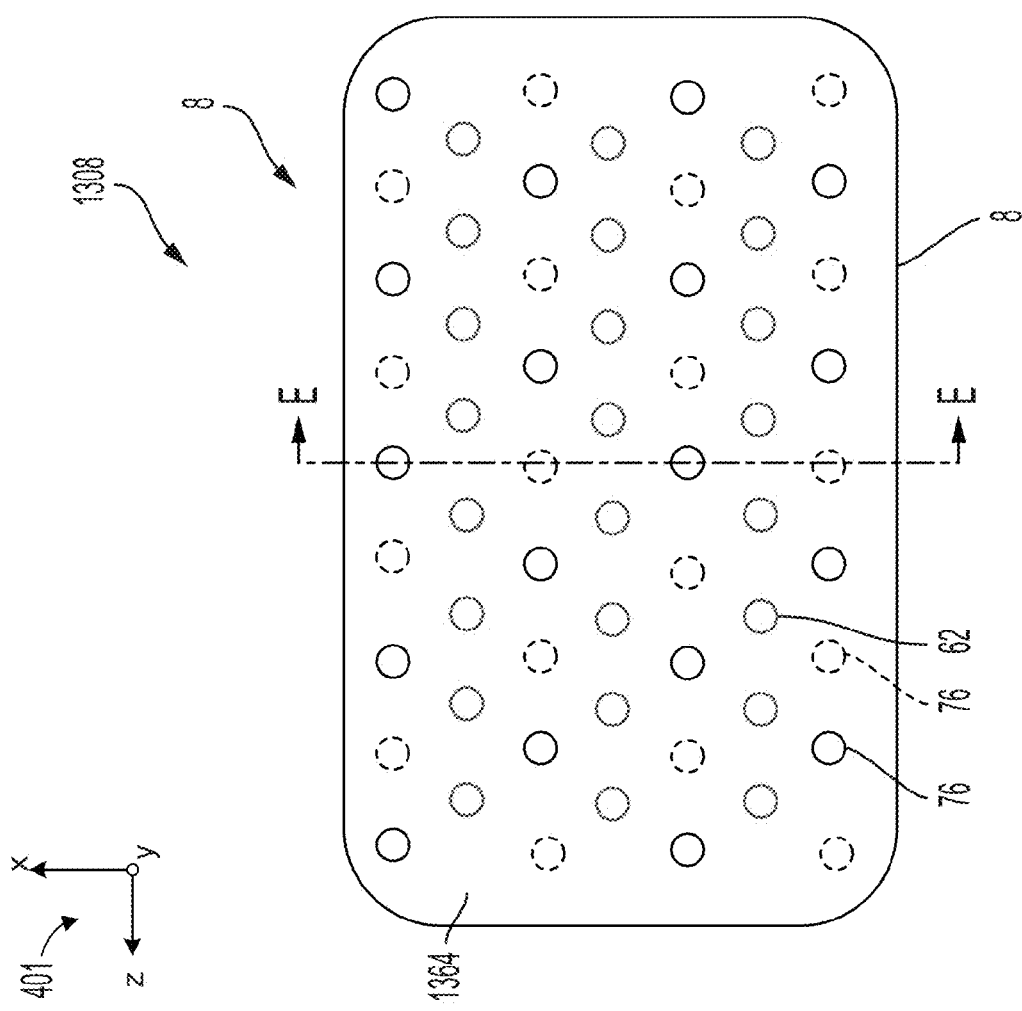
FIG. 13 shows a plan view of a second example of a perforated plate which may be included in a heat exchanger disclosed herein.

FIG. 13 shows a plan view and FIG. 14 shows a cross-sectional view along the line E-E of another embodiment of a perforated plate 1308 which may be used with the heat exchanger 400, disclosed herein. The perforated plate 1308 is provided with one or more dimples 76 that protrude from the perforated plate 1308 in a central planar surface 1364 of the perforated plate 1308. The number, position and shape of the one or more dimples 76 is not limiting and may be varied depending on an application of the heat exchanger 400. The dimples 76 are arranged in alternating columns where each column of dimples 76 is positioned along a length, with respect to the z-axis, of the perforated plate 1308, as shown in FIG. 13, with each column having dimples 76 adjacent to a column having openings 62. However, other variations, including random placement of the dimples 76 and the openings 62 may also be provided on the perforated plate 1308, depending on application demands.

The dimples 76 may provide structural integrity and create a turbulent flow within the heat exchanger 400. Further, the dimples 76 may be disposed all on a first face 1366 of the perforated plate 1308, all on a second face 1368 of the perforated plate 1308, or on both the first 66 and the second faces 68 of the perforated plate 1308, as shown in FIG. 14. In the embodiment shown, the dimples 76 protrude from both the first face 1366 and the second face 1368 of the perforated plate 1308. In addition, the dimples 76 alternate between one dimple 76 extending from the first face 1366 of the perforated plate 8 towards the internal face 12 of the first plate 4 in heat exchanger 400, and the next dimple 76 extending from the second face 1368 of the perforated 1308 plate 8 towards the internal face 44 of the second plate 6. However, other formations are also possible, for example and without limitation, where one column has dimples 76 extending from the first face 1366 of the perforated plate 8, and another column, where the dimples 76 extend from the second face 1368 of the perforated plate 8.

In one embodiment, the dimples 76 protruding from the first face 66 of the perforated plate 8 can be positioned such that in the assembled heat exchanger 400, the dimples 76 extend into the channels 38, as shown in FIGS. 4-5 and 11-12B. Alternatively, the dimples 76 can be positioned to contact and engage with the second end 32 of one of the ribs 28, as shown in FIG. 4, extending from the internal face 12 of the first plate 4 to help provide structural integrity to the heat exchanger 400. When the dimples 76 are positioned to contact the second end 32 of one of the ribs 28, the height of the rib 28 in contact with the dimples 76 can be adjusted to ensure that the perforated plate 8 lies flat and flush, such that the peripheral edge portion 72 of the perforated plate 8 contacts both the flange 24 of the first plate 4 and the flange 58 of the second plate 6, and provides a leak-free heat exchanger 400.

Figure 15:
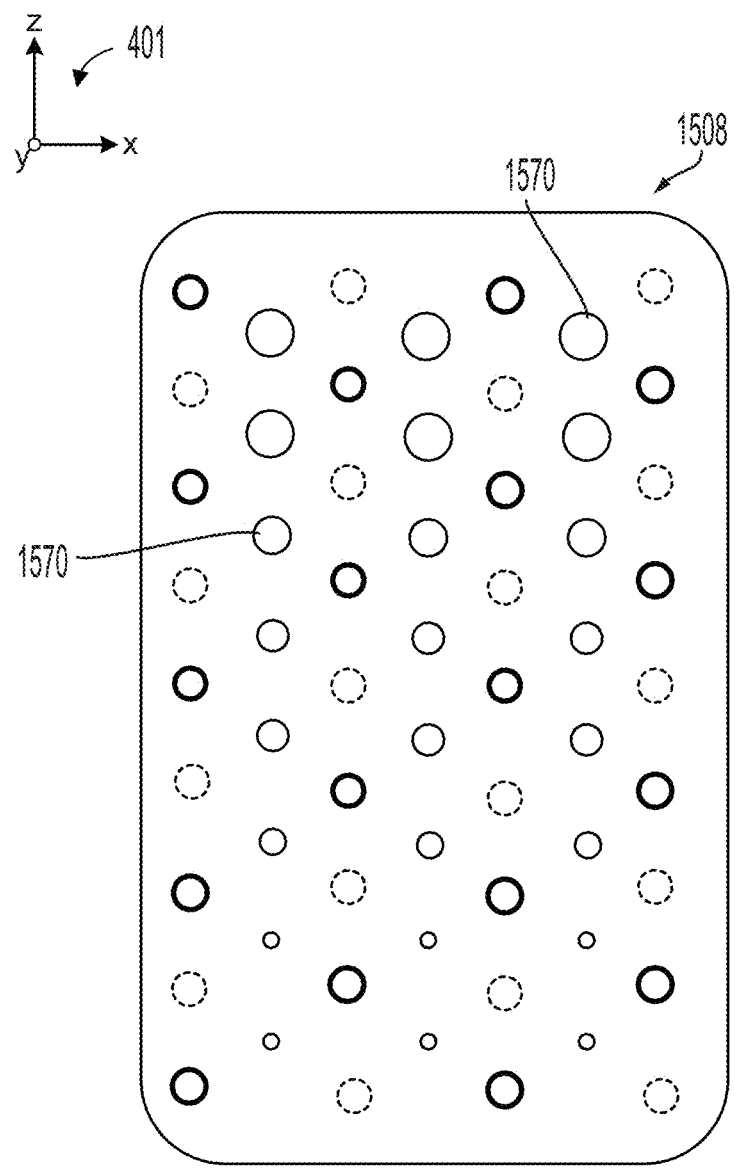
FIG. 15 shows a plan view of a third example of a perforated plate which may be included in a heat exchanger disclosed herein.
Figure 16:
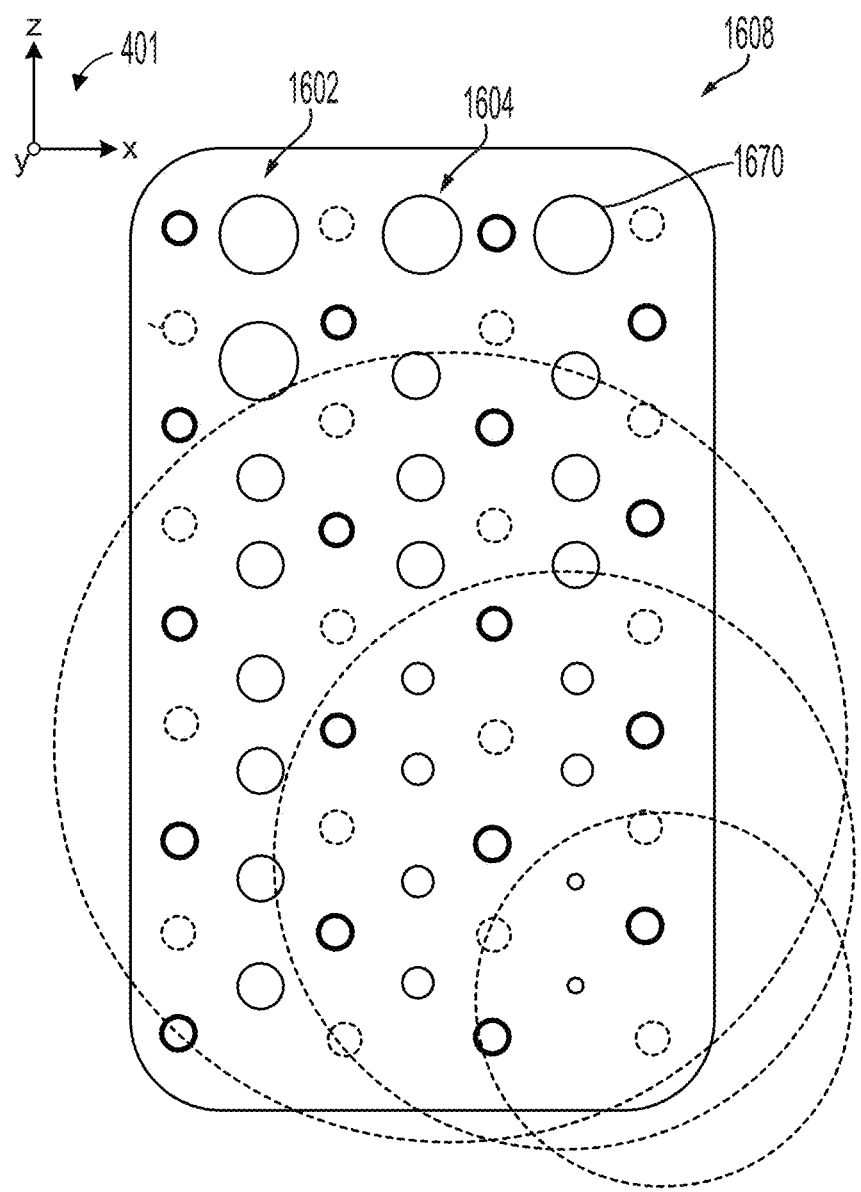
FIG. 16 shows a plan view of a fourth example of a perforated plate which may be included in a heat exchanger disclosed herein.

FIGS. 15 and 16 show further embodiments, 1508 and 1608, respectively, of a perforated plate. In FIGS. 15 and 16, a size of openings 1570 and 1670 provided on the perforated plate 1508, 1608, respectively, may vary. In the perforated plate 1508 embodiment shown in FIG. 15, the openings 1570 increase in size along a length, defined along the z-axis, of the perforated plate 1508. In an alternative embodiment, the perforated plate 1508 may be positioned in the heat exchanger 400 to have the openings 1570 having a larger circumference being away from an inlet, such as the inlet 40 of FIG. 4, such that as the heat exchanger fluid enters the heat exchanger 400 from the inlet 40, the size of the openings 1570 increases as it flows away from the inlet 40. However, other formations are also possible, including a random change in the size of the circumference defining the openings.

As an example, openings 1670 in the perforated plate 1608 of FIG. 16 may have columns of the openings 1670 that change in diameter in a non-uniform manner. For example, a first column 1602 of the openings 1670 may show a smaller increase in diameter of the openings 1670 between a bottom opening and a top opening, with respect to the z-axis, than an increase in diameter of the openings 1670 between a bottom opening and a top opening of a second column 1604. The change in diameter may be more gradual in one column of openings 1670 than another column of openings 1670 in the perforated plate 1608 or a range of diameters of the openings 1670 may vary between the columns.

Figure 17:
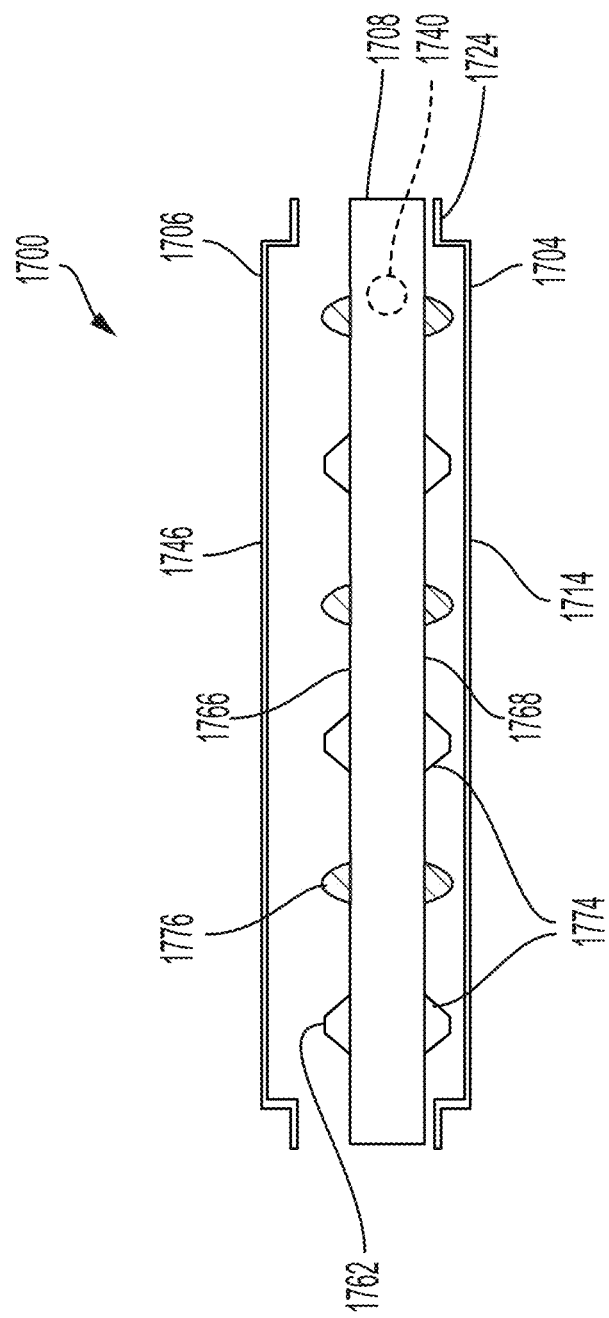
FIG. 17 shows a partially exploded view of a third embodiment of a heat exchanger disclosed herein.

FIG. 17 shows a partially exploded sectional view of a further embodiment of a heat exchanger 1700 in accordance with the specification. The embodiment shown in FIG. 17 is similar to the earlier embodiments disclosed herein, having a first plate 1704 and a second plate 1706, with a perforated plate 1708 sandwiched in between the first plate 1704 and the second plate 1706. For purposes of convenience, the first plate 1704 is shown as being coupled to the perforated plate 1708, with the perforated plate 1708 coupling with a first plate flange 1724, while the second plate 1706 is shown separated from the perforated plate 1708. However, as disclosed herein, during operation or assembly, the second plate 1706 is also coupled to the perforated plate 1708 by coupling a second plate flange (not shown) to the perforated plate 1708.

In the embodiment disclosed in FIG. 17, the perforated plate 1708 is formed by a hollow box having an inlet 1740. Such an embodiment of the perforated plate 1708 can also be considered as a perforated hollow box (or perforated hollow box plate). The shape of the hollow box forming the perforated hollow box plate 1708 is not limiting and may be varied depending upon application demands. In the embodiment shown in FIG. 17, the hollow box forming the perforated plate 1708 is cuboid in shape having rectangular faces. Fluid entering the central hollow cavity of the perforated box plate 1708 from the inlet 1740, passes through openings 1762 formed in a plurality of nozzles 1774 before coming in contact with the first plate 1704 or the second plate 1706. The fluid then exits the heat exchanger 1700 from two outlets (not shown), where one outlet is provided on the first plate 1704 and the second outlet is provided in the second plate 1706.

The plurality of nozzles 1774 are formed on both a first face 1766 and a second face 1768 of the perforated box plate 1708. In addition, both the first face 1766 and the second face 1768 of the perforated box plate 1708 is provided with a plurality of dimples 1776 that can help to provide structural integrity to the first plate 1704 and the second plate 1706. By use of such a perforated box plate 1708, the heat exchange fluid can help evenly cool or help to provide temperature control of both the first plate 1706 and the second plate 1708, allowing both an external face 1714 of the first plate 1704 and an external face 1746 of the second plate 1706 to be used for temperature control or cooling of battery cells 102, which can be placed on both the first plate 1704 and the second plate 1706.

In this way, heat generated by vehicle batteries may be dissipated by a heat exchanger configured with a first plate and a second plate, and a perforated plate disposed therebetween. The perforated plate may allow exchange of heat transfer fluid between an inlet chamber and an outlet chamber of the heat exchanger. A temperature uniformity of the heat exchanger is thereby increased, enhancing an efficiency of heat dissipation provided by the heat exchanger.

| PARTS LIST | |
|---|---|
| No. | Description |
| 2 | Heat exchanger |
| 4 | first plate |
| 6 | Second plate |
| 8 | Perforated plate |
| 10 | first plate central planar surface |
| 12 | internal face of 10 |
| 14 | external face of 10 |
| 16 | first plate peripheral wall |
| 18 | first end of 16 |
| 20 | Second end of 16 |
| 22 | peripheral edge of 12 |
| 24 | first plate flange |
| 26 | Inlet chamber |
| 28 | Ribs |
| 30 | One (or first) end of 28 |
| 32 | Second end of 28 |
| 34 | First end of first plate |
| 36 | Second end of first plate |
| 38 | Channels |
| 40 | Inlet |
| 42 | $2^{nd}$ plate central planar surface |
| 44 | internal face of 42 |
| 46 | external face of 42 |
| 48 | Second plate peripheral wall |
| 50 | Peripheral edge of 44 |
| 52 | First end of 48 |
| 54 | Second end of 48 |
| 56 | Outlet chamber |
| 58 | Flange |
| 60 | Outlet |
| 62 | Plurality of openings |
| 64 | Central planar surface of 8 |
| 66 | First face of 8 |

-continued

| PARTS LIST | |
|---|---|
| No. | Description |
| 68 | Second face of 8 |
| 70 | Plurality of openings in 8 |
| 72 | Peripheral edge portion of 8 |
| 74 | Plurality of nozzles |
| 76 | Dimples on 8 |
| 78 | Hollow cavity |
| 102 | Battery cell(s) |

Certain adaptations and modifications of the described embodiments can be made. Therefore, the above discussed embodiments are considered to be illustrative and not restrictive.

FIGS. 4-17 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a heat exchanger includes a first plate, a second plate and a perforated plate having a plurality of openings, the perforated plate sandwiched between the first plate and the second plate, the first plate having a first plate central planar surface having an internal face and an opposing external face, a first plate peripheral wall having a first end and a second opposing end, the first plate peripheral wall coupled at or extending from the first end to and extending from a peripheral edge of the internal face of the first plate central planar surface, wherein the first plate central planar surface and the first plate peripheral wall together defining an inlet chamber, and an inlet permitting fluid flow on to the internal face of the central planar surface, and the second plate having a second plate central planar surface having an internal face and an opposing external face, a second plate peripheral wall having a first end and a second opposing end, the second plate peripheral wall coupled at or extending from the first end to and extending from a peripheral edge of the internal face of the second plate central planar surface, the second plate peripheral wall extending towards the first plate, wherein the second plate central planar surface and the second plate peripheral wall together defining an outlet chamber, and an outlet permitting fluid to exit from the heat exchanger, wherein the first plate and the second plate being in a face to face relation with the first plate internal face facing the second plate internal face, and the first plate, the second plate and the perforated plate being coupled and defining a fluid passage for flow of a heat exchanger fluid from the inlet to the outlet. In a first example of the heat exchanger, protuberances or ribs extending from the internal face of the first plate central planar surface. A second example of the heat exchanger optionally includes the first example, and further includes a plurality of ribs extending from the inner face of the first plate central planar surface, the plurality of ribs positioned along the length of the first plate from proximate a first end of the first plate to proximate an opposing second end of the first plate. A third example of the heat exchanger optionally includes one or more of the first and second examples, and further includes, wherein the perforated plate having a plurality of nozzles, and each nozzle having an opening, to provide the plurality of openings. A fourth example of the heat exchanger optionally includes one or more of the first through third examples, and further includes, wherein each nozzle is shaped to promote fluid to flow from the inlet chamber to the outlet chamber. A fifth example of the heat exchanger optionally includes one or more of the first through fourth examples, and further includes a plurality of dimples extending from the perforated plate. A sixth example of the heat exchanger optionally includes one or more of the first through fifth examples, and further includes, wherein a first portion of the dimples extend from a first face of the perforated plate in a first direction towards the first plate, and a second portion of the dimples extend from an opposing second face of the perforated plate in a second direction towards the second plate, the second direction being opposed to the first direction. A seventh example of the heat exchanger optionally includes one or more of the first through sixth examples, and further includes, a plurality of ribs extending from the inner face of the first plate central planar surface, the plurality of ribs positioned along the length of the first plate from proximate a first end of the first plate to proximate an opposing second end of the first plate, a plurality of dimples extending from the perforated plate, wherein a first portion of the dimples extend from a first face of the perforated plate in a first direction towards the first plate, and wherein at least one of the dimples of the first portion being in contact with an end of one of the plurality of the ribs, the end of one of the plurality of ribs being proximate to the perforated plate. An eighth example of the heat exchanger optionally includes one or more of the first through seventh examples, and further includes, wherein the circumferences defining the plurality of openings are of varying sizes. A ninth example of the heat exchanger optionally includes one or more of the first through eighth examples, and further includes, wherein the first plate central planar surface having a first end and an opposing second end, and wherein the size of the circumferences defining the plurality of openings increases in size from the first end to the second end. A tenth example of the heat exchanger optionally includes one or more of the first through ninth examples, and further includes, wherein the first plate central planar surface having a first corner and a diagonally opposed second corner, and wherein the circumferences defining the plurality of openings increases in size from the first corner to the second corner. An eleventh example of the heat exchanger optionally includes one or more of the first through tenth examples, and further includes a first plate flange coupled at or extending from the second end of the first plate peripheral wall, the first plate flange extending away from the central planar surface, and a second plate flange coupled at or extending from the second end of the second plate peripheral wall, the second plate flange extending away from the central planar surface of the second plate. A twelfth example of the heat exchanger optionally includes one or more of the first through eleventh examples, and further includes, wherein a portion of the perforated plate is in contact with and sandwiched between the first plate flange and the second plate flange.

In another embodiment, a system includes a first plate, a second plate and a perforated plate having a plurality of openings, the perforated plate sandwiched between the first plate and the second plate, the first plate having a first plate central planar surface having an internal face and an opposing external face, a first plate peripheral wall having a first end and a second opposing end, the first plate peripheral wall coupled at or extending from the first end to and extending from a peripheral edge of the internal face of the first plate central planar surface; wherein the first plate central planar surface and the first plate peripheral wall together defining an inlet chamber, and an inlet permitting fluid flow on to the internal face of the central planar surface, and the second plate having a second plate central planar surface having an internal face and an opposing external face, a second plate peripheral wall having a first end and a second opposing end, the second plate peripheral wall coupled at or extending from the first end to and extending from a peripheral edge of the internal face of the second plate central planar surface, the second plate peripheral wall extending towards the first plate; wherein the second plate central planar surface and the second plate peripheral wall together defining an outlet chamber, and an outlet permitting fluid to exit from the heat exchanger, wherein the first plate and the second plate being in a face to face relation with the first plate internal face facing the second plate internal face, and the first plate, the second plate and the perforated plate being coupled and defining a fluid passage for flow of a heat exchanger fluid from the inlet to the outlet. In a first example of the system, the perforated plate having a plurality of nozzles, and each nozzle having an opening, to provide the plurality of openings. A second example of the system optionally includes the first example, and further includes a plurality of dimples extending from the perforated plate. A third example of the system optionally includes one or more of the first and second examples, and further includes a plurality of ribs extending from the inner face of the first plate central planar surface, the plurality of ribs positioned along the length of the first plate from proximate a first end of the first plate to proximate an opposing second end of the first plate, a plurality of dimples extending from the perforated plate, wherein a first portion of the dimples extend from a first face of the perforated plate in a first direction towards the first plate, and wherein at least one of the dimples of the first portion being in contact with an end of one of the plurality of the ribs, the end of one of the plurality of ribs being proximate to the perforated plate. A fourth example of the system optionally includes one or more of the first through third examples, and further includes, wherein the circumferences defining the plurality of openings are of varying sizes. A fifth example of the system optionally includes one or more of the first through fourth examples, and further includes, a first plate flange coupled at or extending from the second end of the first plate peripheral wall, the first plate flange extending away from the central planar surface, and a second plate flange coupled at or extending from the second end of the second plate peripheral wall, the second plate flange extending away from the central planar surface of the second plate.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A heat exchanger comprising:
   a first plate, a second plate, and a perforated plate having a plurality of openings, the perforated plate sandwiched between the first plate and the second plate;
   the first plate having:
      a first plate central planar surface having an internal face and an opposing external face;
      a first plate peripheral wall having a first end and a second opposing end, the first plate peripheral wall coupled at or extending from the first end to and extending from a peripheral edge of the internal face of the first plate central planar surface; wherein the first plate central planar surface and the first plate peripheral wall together define an inlet chamber; and
      an inlet permitting fluid flow on to the internal face of the central planar surface; and
   the second plate having:
      a second plate central planar surface having an internal face and an opposing external face;
      a second plate peripheral wall having a first end and a second opposing end, the second plate peripheral wall coupled at or extending from the first end to and extending from a peripheral edge of the internal face of the second plate central planar surface, the second plate peripheral wall extending towards the first plate; wherein the second plate central planar surface and the second plate peripheral wall together define an outlet chamber; and
      an outlet permitting fluid to exit from the heat exchanger;
   wherein the first plate and the second plate are in a face to face relation with the first plate internal face facing the second plate internal face, and wherein the first plate, the second plate, and the perforated plate are coupled and define a fluid passage for flow of a heat exchanger fluid from the inlet to the outlet, and wherein the second plate is in contact with a plurality of battery cells,
   wherein the perforated plate has a plurality of nozzles, and each nozzle has an opening, to provide the plurality of openings.

2. The heat exchanger according to claim 1, further comprising:
   protuberances or ribs extending from the internal face of the first plate central planar surface.

3. The heat exchanger according to claim 1, further comprising:
   a plurality of ribs extending from the internal face of the first plate central planar surface, the plurality of ribs positioned along the length of the first plate from proximate a first end of the first plate to proximate an opposing second end of the first plate.

4. The heat exchanger of claim 1, wherein each nozzle is shaped to promote fluid to flow from the inlet chamber to the outlet chamber.

5. The heat exchanger of claim 1, further comprising a plurality of dimples extending from the perforated plate.

6. The heat exchanger of claim 5, wherein a first portion of the dimples extend from a first face of the perforated plate in a first direction towards the first plate, and a second portion of the dimples extend from an opposing second face of the perforated plate in a second direction towards the second plate, the second direction being opposed to the first direction.

7. The heat exchanger of claim 1, further comprising:
   a plurality of ribs extending from the internal face of the first plate central planar surface, the plurality of ribs positioned along the length of the first plate from proximate a first end of the first plate to proximate an opposing second end of the first plate; and
   a plurality of dimples extending from the perforated plate, wherein a first portion of the dimples extend from a first face of the perforated plate in a first direction towards the first plate,
   wherein at least one of the dimples of the first portion is in contact with an end of one of the plurality of the ribs, the end of one of the plurality of ribs being proximate to the perforated plate.

8. The heat exchanger of claim 1, wherein the circumferences defining the plurality of openings are of varying sizes.

9. The heat exchanger of claim 1, wherein the first plate central planar surface has a first end and an opposing second end, and wherein the size of the circumferences defining the plurality of openings increases in size from the first end to the second end.

10. The heat exchanger of claim 1, wherein the first plate central planar surface has a first corner and a diagonally opposed second corner, and wherein the circumferences defining the plurality of openings increases in size from the first corner to the second corner.

11. The heat exchanger of claim 1, further comprising:
   a first plate flange coupled at or extending from the second end of the first plate peripheral wall, the first plate flange extending away from the central planar surface; and
   a second plate flange coupled at or extending from the second end of the second plate peripheral wall, the second plate flange extending away from the central planar surface of the second plate.

12. The heat exchanger of claim 1, wherein the second plate is in face-sharing contact with the plurality of battery cells.

13. A system having a battery cell in contact with a heat exchanger, the heat exchanger comprising:
   a first plate, a second plate, and a perforated plate having a plurality of openings, the perforated plate sandwiched between the first plate and the second plate;
   the first plate having
      a first plate central planar surface having an internal face and an opposing external face;
      a first plate peripheral wall having a first end and a second opposing end, the first plate peripheral wall coupled at or extending from the first end to and extending from a peripheral edge of the internal face of the first plate central planar surface; wherein the first plate central planar surface and the first plate peripheral wall together define an inlet chamber; and an inlet permitting fluid flow on to the internal face of the central planar surface; and the second plate having a second plate central planar surface having an internal face and an opposing external face;

a second plate peripheral wall having a first end and a second opposing end, the second plate peripheral wall coupled at or extending from the first end to and extending from a peripheral edge of the internal face of the second plate central planar surface, the second plate peripheral wall extending towards the first plate; wherein the second plate central planar surface and the second plate peripheral wall together define an outlet chamber; and an outlet permitting fluid to exit from the heat exchanger;

wherein the first plate and the second plate are in a face to face relation with the first plate internal face facing the second plate internal face, and the first plate, the second plate, and the perforated plate are coupled and define a fluid passage for flow of a heat exchanger fluid from the inlet to the outlet, and wherein the perforated plate has a plurality of nozzles, and each nozzle has an opening, to provide the plurality of openings.

14. The system of claim 13, further comprising:
protuberances or ribs extending from the internal face of the first plate central planar surface.

15. The system of claim 13, further comprising a plurality of dimples extending from the perforated plate.

16. The system of claim 13, further comprising:
a plurality of ribs extending from the internal face of the first plate central planar surface, the plurality of ribs positioned along the length of the first plate from proximate a first end of the first plate to proximate an opposing second end of the first plate; and a plurality of dimples extending from the perforated plate, wherein a first portion of the dimples extend from a first face of the perforated plate in a first direction towards the first plate, wherein at least one of the dimples of the first portion is in contact with an end of one of the plurality of the ribs, the end of one of the plurality of ribs being proximate to the perforated plate.

17. The system of claim 13, wherein the circumferences defining the plurality of openings are of varying sizes.

18. The system of claim 13, further comprising:
a first plate flange coupled at or extending from the second end of the first plate peripheral wall, the first plate flange extending away from the central planar surface; and a second plate flange coupled at or extending from the second end of the second plate peripheral wall, the second plate flange extending away from the central planar surface of the second plate.

* * * * *